United States Patent
Oberman et al.

(10) Patent No.: US 8,502,643 B2
(45) Date of Patent: Aug. 6, 2013

(54) METHODS AND APPARATUS FOR SELF CHECK-IN OF ITEMS FOR TRANSPORTATION

(75) Inventors: Justin P. Oberman, Chicago, IL (US); Stephen A. Belin, Superior, CO (US)

(73) Assignee: L-I Identity Solutions Operating Company, Stamford, CT (US)

( * ) Notice: Subject to any disclaimer, the term of this patent is extended or adjusted under 35 U.S.C. 154(b) by 849 days.

(21) Appl. No.: 11/879,741

(22) Filed: Jul. 17, 2007

(65) Prior Publication Data

US 2008/0024271 A1   Jan. 31, 2008

Related U.S. Application Data

(60) Provisional application No. 60/831,876, filed on Jul. 18, 2006.

(51) Int. Cl.
*G05B 19/00* (2006.01)

(52) U.S. Cl.
USPC ......... 340/5.86; 340/5.61; 340/5.64; 340/5.8; 340/5.81; 340/5.82

(58) Field of Classification Search
USPC ............................. 340/5.61, 5.64, 5.8–5.86
See application file for complete search history.

(56) References Cited

U.S. PATENT DOCUMENTS

| | | | |
|---|---|---|---|
| 5,869,822 A * | 2/1999 | Meadows et al. | 235/380 |
| 6,044,353 A * | 3/2000 | Pugliese, III | 705/5 |
| 6,111,506 A * | 8/2000 | Yap et al. | 340/572.1 |
| 7,475,812 B1 * | 1/2009 | Novozhenets et al. | 235/382 |
| 7,599,847 B2 * | 10/2009 | Block et al. | 705/5 |
| 7,671,746 B2 * | 3/2010 | Martinez de Velasco Cortina et al. | 340/572.4 |
| 2002/0030582 A1 * | 3/2002 | Depp et al. | 340/5.53 |
| 2002/0100803 A1 | 8/2002 | Sehr | |
| 2005/0001711 A1 * | 1/2005 | Doughty et al. | 340/5.74 |
| 2006/0016875 A1 * | 1/2006 | Bonalle et al. | 235/380 |
| 2006/0100960 A1 * | 5/2006 | Rodin et al. | 705/40 |
| 2006/0176150 A1 * | 8/2006 | Rehn | 340/5.81 |
| 2007/0008138 A1 * | 1/2007 | Mosher et al. | 340/572.4 |

OTHER PUBLICATIONS

International Search Report dated Oct. 1, 2008 for application No. PCT/US2007/016296.

* cited by examiner

*Primary Examiner* — Jennifer Mehmood
*Assistant Examiner* — Andrew Bee
(74) *Attorney, Agent, or Firm* — Fish & Richardson P.C.

(57) ABSTRACT

Disclosed are bag check machines, including related methods, apparatus, and systems, including computer program products, implementing and using techniques for allowing a user to self-check one or more items for transportation. The user is first enrolled in a self-check program by reading personal ID information from a government-issued identification (ID) document and verifying the ID document based on the personal ID information. Biometric data from the user is captured and stored, in an encoded form, on a portable ID storage medium issued to the user. For the user to self-check one or more items, encoded biometric data is read from the portable ID storage medium, and biometric data is captured from the user. When the captured biometric data matches the biometric data read from the portable ID storage medium, the user is authorized to check-in the item or items.

12 Claims, 9 Drawing Sheets

METHODS AND APPARATUS FOR SELF CHECK-IN OF ITEMS FOR TRANSPORTATION

RELATED APPLICATION DATA

This application claims priority under 35 U.S.C. 119(e) to the provisional application entitled: "PASSENGER TAGGING OF CHECKED BAGGAGE," U.S. Provisional Application No. 60/831,876, filed Jul. 18, 2006, which is incorporated herein by reference.

TECHNICAL FIELD

The present invention relates to the identification and authorization of items for transportation. More particularly, the present invention relates to the check-in of items for transportation by verification of personal information, such as biometrics or biographical data.

BACKGROUND

Efficient and effective transportation of items is an essential aspect of modern society. Various items are transported everyday by plane, train, automobile, and other modes. In an increasingly global society and economy, increasing numbers of individuals require effective transportation of their goods to a wide variety of destinations.

With increasing security concerns around the world, for example, due to terrorist threats, it becomes important not only to provide effective methods for transporting items, but also to identify and verify the individuals associated with the items. Such security concerns are often heightened in congested areas with large numbers of people.

An airport serves as one example of a congested area having problems associated with conventional identification and transportation of items. Checking items at an airport is difficult for both passengers and airlines. Currently, it is estimated that over a billion bags are checked by the airlines each year. Each bag requires a bag tag and an airline representative to attach it. Because the airports and airlines do not permit passengers to check their own bags, passengers often must wait in long lines before reaching an airline representative. Only after the passenger shows proof of identity to the airline representative, and physically hands over the bags, does the airline representative attach tags to their luggage. This is all done before the passenger is allowed to pass through security, increasing airport delay and airline expense.

Today, most airlines provide a kiosk, which allows passengers without bags to check-in and obtain a boarding pass. However, passengers with bags to check are required to obtain assistance from airline personnel, e.g., skycaps, ticket agents, or other representatives, to print and affix tags to their checked bags. Airline and airport personnel responsible for attaching tags face long lines and frustrated passengers. Thus, airline representatives are often motivated to tag and route bags more quickly than carefully. As well, bags are often lost, adding to the frustration of both the passengers and airlines.

Conventional bag checking and tracking systems use optical bar codes to identify and route bags. Many of the optical tags are unreadable, requiring the bags to be manually identified and routed. The manual routing increases delays and increases the likelihood of misidentifying or misrouting a bag. Lost luggage harms airlines in terms of expense, reputation, and customer loyalty.

Conventional bag checking procedures are also insecure. Airline or airport personnel, often rushed and fatigued, are required to visually examine a passenger and compare the passenger with his or her photo ID during every bag check. This often results in cursory checks and mistakes. In addition, the excessive time passengers spend in line waiting to check bags causes overcrowding in insecure areas of the airport. Such overcrowding would only contribute to increased casualties in the event of a major disaster, such as a terrorist attack. Finally, delays in checking and routing bags mean that bags spend more time in insecure areas of the airport before passing through security.

The shortcomings of conventional procedures, as explained above, are generally based on lack of automation, slow transaction time, higher-than-necessary transaction costs, increased likelihood of error, and sub-optimal security. On a more personal level, airline personnel and passengers are frustrated. Airline personnel are overworked, and passengers have lost trust and confidence in the system. Some passengers are dissuaded from checking bags at all.

SUMMARY

Aspects of the present invention relate to methods and apparatus, including computer program products, implementing and using techniques for self check-in of one or more items for transportation.

One aspect of the present invention relates to a method for enrolling in a self check-in program, for a user to check-in one or more items for transportation. Personal ID information is read from a government-issued identification (ID) document. The ID document is verified based on the personal ID information. The verification often includes querying a database of government-issued ID documents to identify the received ID document. When the received ID document is identified in the database, biometric data from the user is captured. The biometric data is stored on a portable ID storage medium, and is encoded. The portable ID storage medium having the encoded biometric data is issued.

Another aspect of the present invention relates to a method for enabling self check-in of one or more item for transportation, using a portable identification (ID) storage medium having encoded biometric data verified as associated with a user. The portable ID storage medium is received, and encoded biometric data is read from the portable ID storage medium. Biometric data is captured from the user. The user's identity is verified by comparing the captured biometric data with the biometric data read from the portable ID storage medium. When the captured biometric data matches the biometric data read from the portable ID storage medium, the user is authorized to check-in the item or items.

Another aspect of the present invention relates to a data processing apparatus for enrolling in a self-check program for a user to check-in one or more items for transportation. The apparatus includes an identification (ID) input device capable of reading personal ID information from a government-issued ID document. The apparatus also includes an ID verification device configured to verify the ID document based on the personal ID information. The ID verification device is often configured to query a database of government-issued ID documents to identify the received ID document. Additionally, the apparatus includes a biometric data input device capable of capturing, when the received ID document is identified in the database, biometric data from the user. Also included in the apparatus is a portable ID storage medium output device configured to store the biometric data, which is encoded, on a portable ID storage medium and issue the portable ID storage medium having the encoded biometric data.

Another aspect of the present invention relates to a data processing apparatus for enabling self check-in of an item for transportation using a portable identification (ID) storage medium having encoded biometric data verified as associated with a user. The apparatus includes a portable ID storage medium input device capable of receiving the portable ID storage medium and reading the encoded biometric data from the portable ID storage medium. Additionally, the apparatus includes a biometric data input device capable of capturing biometric data from the user. The apparatus also includes a processor configured to compare the captured biometric data with the biometric data read from the portable ID storage medium and output a signal authorizing check-in of the item by the user when the captured biometric data matches the biometric data read from the portable ID storage medium.

A further understanding of the nature of the present invention may be realized by reference to the remaining portions of the specification and the figures.

DETAILED DESCRIPTION

Reference will now be made in detail to specific embodiments of the invention including the best modes contemplated by the inventors for carrying out the invention. Examples of these specific embodiments are illustrated in the accompanying figures. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In the process of self check-in for air travel, and other modes of transportation, embodiments of the present invention provide travelers with the ability not only to obtain a boarding pass, but also to self check-in luggage, that is, check-in the bags without assistance from airline personnel and baggage handlers. Embodiments of the present invention enable passengers to tag their own checked bags, while verifying that those bags belong to the passenger checking them. To accomplish this, biometrics, RFID, other forms of identification, or some combination thereof can be used.

In some embodiments, a first-time user is enrolled by verifying identity according to a government-issued ID, and subsequently tracked using biometric data. Embodiments of the enrollment process include comparison of the user with information on a government-issued ID. The government-issued ID can be electronically verified against a database of government-issued IDs. Biometric data captured from the user would be stored in such a way as to be linked to the identity verification. Thus, verification by a human during check-in may be unnecessary because the user's identity is traceable back to the original verified government-issued IDs.

Embodiments of the item check-in process often involve comparison of biometric data, captured from the user during check-in, to biometric data stored in the enrollment process. When the data match, then the user's identity is verified as the user identified during the enrollment process with the government-issued ID. Thus, the user may be reliably identified without verification by another human. The bag to be checked in is linked to the user's identity by a tag, card, or other form of storage media.

Figure 1:
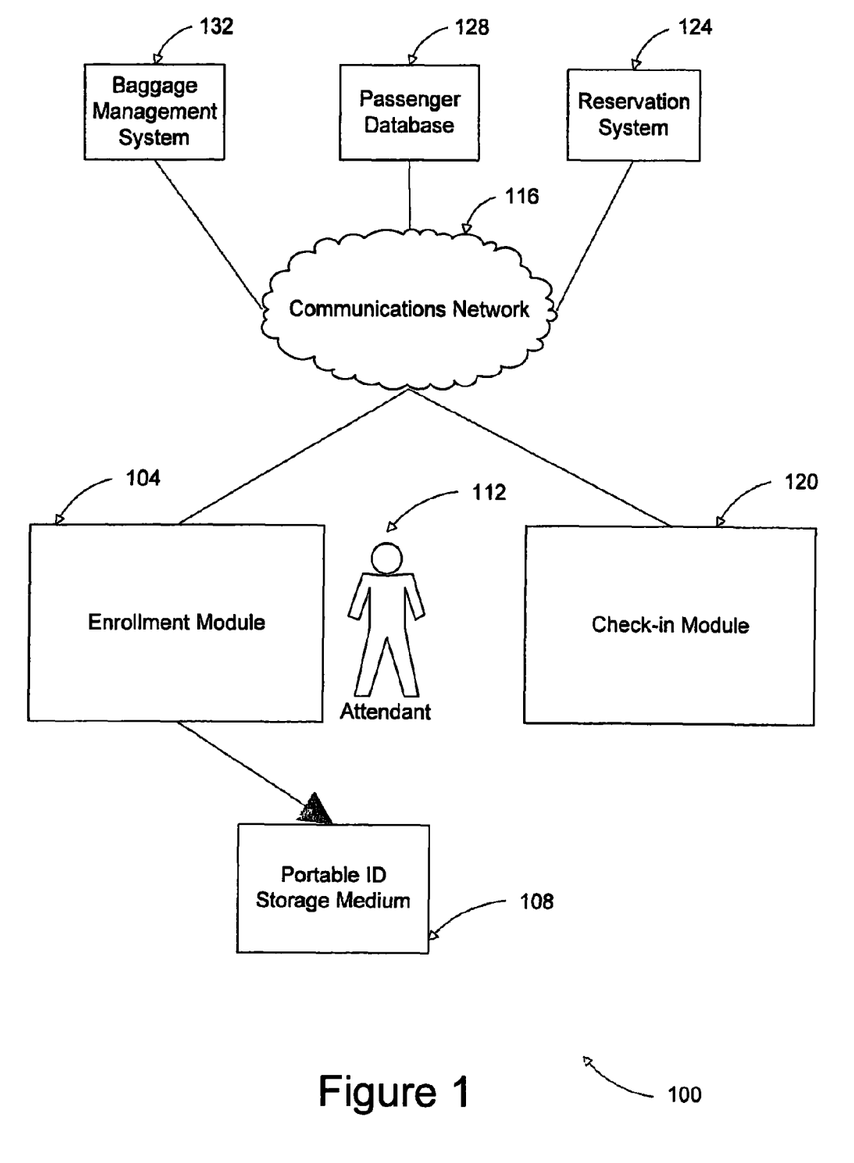
FIG. 1 illustrates a block diagram of a system 100 for self check-in of items, constructed according to one embodiment of the present invention.

One embodiment of a self check-in system 100 that allows a user to check-in items for transportation is illustrated in FIG. 1. In this embodiment, the system 100 includes an enrollment module 104, which allows a user to enroll in a self check-in program. In some embodiments, the enrollment module 104 is a stand-alone unit located in, for example, a hotel, airport, bus terminal, shopping mall, or any other publicly accessible location. In other embodiments, the enrollment module 104 is a component of a larger device, such as an airport kiosk. In some implementations, existing kiosks are retrofitted to include the requisite components for the enrollment module 104. In still other embodiments, the enrollment module 104 includes modular components coupled to a computer.

In the embodiment illustrated in FIG. 1, the enrollment module 104 is attended by an attendant 112 who verifies the user's identity and assists in enrolling the user. Once enrolled, the user is issued a portable identification ("ID") storage medium 108. The portable ID storage medium 108 could include a bar code, RFID tag, magnetic strip, smart card, or any other portable means of storing encoded biometric data. In one embodiment, the enrollment module 104 is connected to a communications network 116 to facilitate remote recording of the user's enrollment and/or additional verification of the user's identity. To this end, the communications network 116 can be connected to various reservation systems 124, such as Sabre®, Galileo®, or Amadeus®, as well as passenger databases 128, which could contain information such as passenger biographic or reward data. The communications network 116 can also be connected to a baggage management system 132 that can contain bag routing information or link bag checking information to passenger information. Once enrolled, the user may check-in one or more items for transportation at the check-in module 120. The check-in module can be connected to the communications network 116 to aid in verifying the user's identity or reservation status.

Figure 2A:
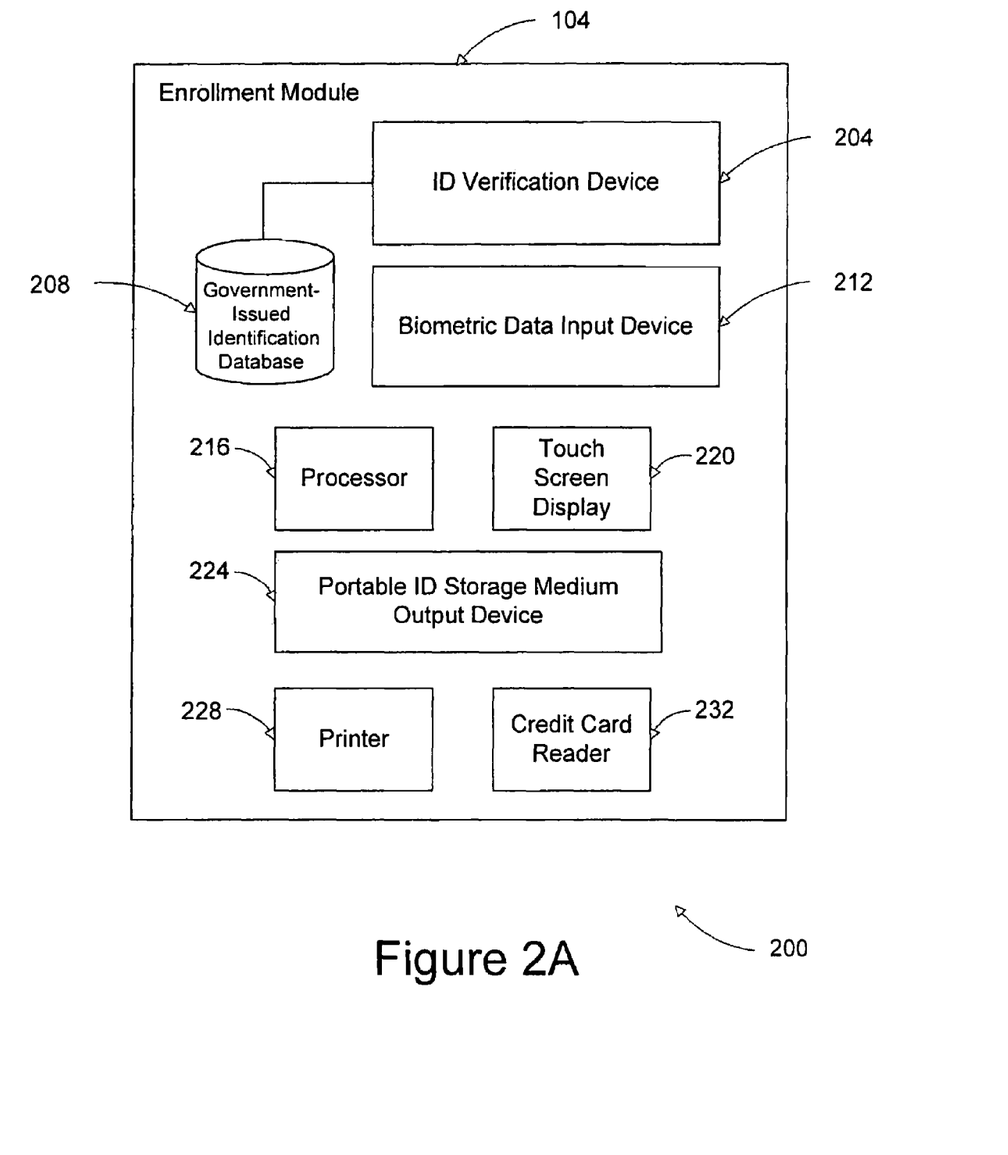
FIG. 2A illustrates a block diagram of the enrollment module 104 of FIG. 1, configured as a stand-alone unit, in accordance with one embodiment of the present invention.
Figure 2B:
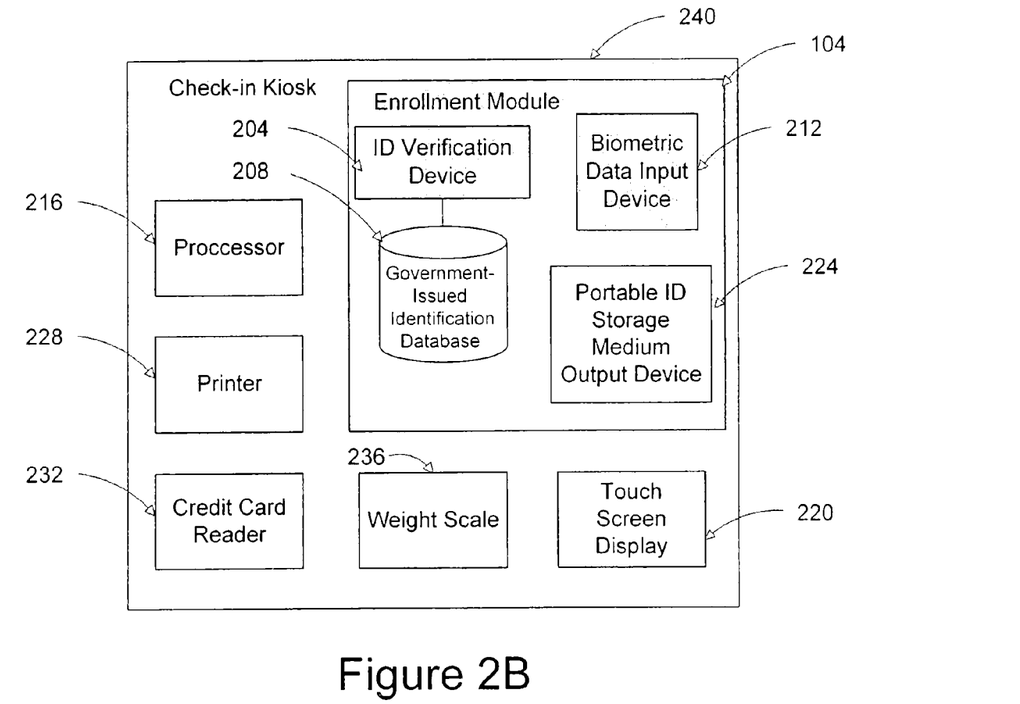
FIG. 2B illustrates a block diagram of a check-in kiosk having as one component the enrollment module 104 of FIG. 1, in accordance with one embodiment of the present invention.
Figure 2C:
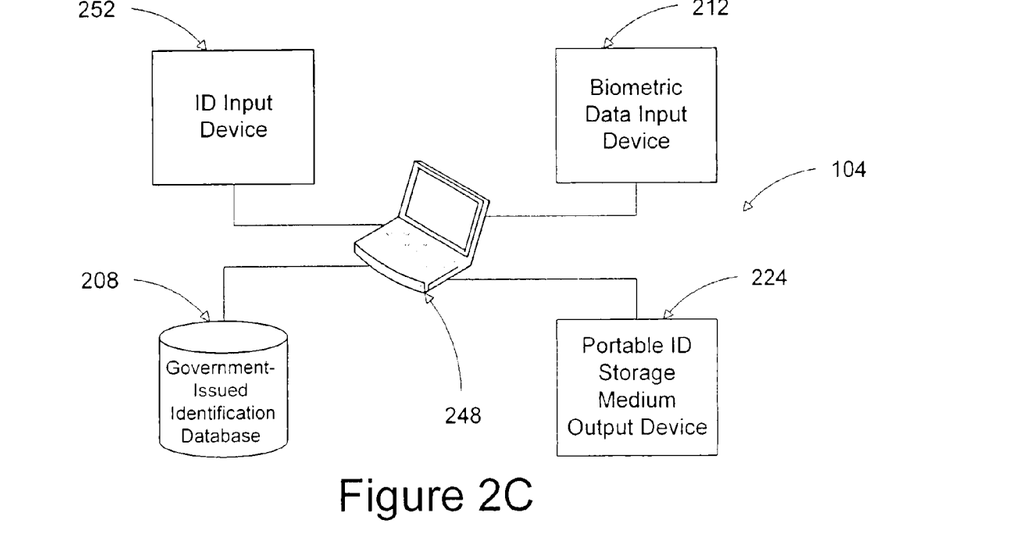
FIG. 2C illustrates a block diagram of the enrollment module 104 of FIG. 1 configured as a modular computer system, in accordance with one embodiment of the present invention.

Several embodiments of the enrollment module 104 are illustrated in FIGS. 2A-C. FIG. 2A depicts an embodiment of the enrollment module 104 as a stand-alone unit 200. In this embodiment 200, the enrollment module 104 includes an ID verification device 204 coupled to a database 208 of government-issued IDs. The ID verification device 204 is capable of receiving a government-issued ID document from the user and reading personal ID information from the received ID document. The ID verification device 204 includes a reader capable of reading and verifying various cards, smart cards, documents, images, bar codes, RFID tags, and other data storage mediums, often in the form of a government-issued ID. In one embodiment, the ID verification device 204 includes the Viisage iA-thenticate SmartChip unit.

In FIG. 2A, the enrollment module 104 also includes a biometric data input device 212 capable of scanning the user's biometric data. Examples of a suitable biometric input device 212 include a fingerprint scanner, such as the Identix Touchprint 4100 or Identix DFR 2100, a palm scanner, a camera, a vein scanner, a microphone, an iris scanner, a retinal scanner, e.g., Panasonic BM-ET330, and other mechanisms capable of scanning the user's biometric data. In one implementation, the biometric input device 212 includes mechanisms for capturing more than one type of biometric data.

In FIG. 2A, the stand-alone enrollment module 200 also includes a processor 216 and a touch screen display 220 capable of receiving the user's personal ID data, biographic data, and any information relevant to enrollment. Personal ID or biographic data can include such information as name, date of birth, address, social security number, e-mail address, and/or any information serving to identify the user. Alternative input/output devices can be used in place of the touch screen display 220, such as a keyboard or mouse for interacting with a conventional display. The enrollment module 200 also includes a portable ID storage medium output device 224, which can include a printer, an RFID writer, a card writer, a smart card writer, and/or other suitable mechanisms for outputting the user's encoded biometric data on a portable ID storage medium 108. The enrollment module 104 includes a printer 228 capable of printing boarding passes, and a credit card reader 232 as well. In one embodiment, printer 228 is capable of printing both boarding passes and portable ID storage media 108, for example, in the form of printed bag tags.

FIG. 2B depicts an embodiment of the enrollment module 104 as a component of a check-in kiosk 240 capable of allowing a user to check an item. In this embodiment, similar to FIG. 2A, the enrollment module contains an ID verification device 204 coupled to a database 208 of government-issued IDs, a biometric data input device 212, and a portable ID storage medium output device 224 all configured substantially as described above. The physical arrangement of these components may differ from the stand-alone implementation of FIG. 2A, as should be understood by those skilled in the art. The check-in kiosk 240 also contains apparatus generally included in conventional kiosks, including a processor 216, a credit card reader 232, a weight scale 236, and a touch screen display 220. Alternative I/O devices can be used in place of the touch screen display 220, such as a conventional display coupled with a keyboard or mouse. The check-in kiosk also includes a printer 228 configured, in one embodiment, to print both boarding passes and portable ID storage media 108, as described above with reference to FIG. 2A.

FIG. 2C depicts an embodiment of the enrollment module 104 as modular components coupled to a computer 248. The embodiment illustrated in FIG. 2C includes a biometric data input device 212, a portable ID storage medium output device 224, and an ID input device 252. The computer 248 may include or be coupled to a database 208 of government-issued IDs. The ID input device 252 includes a card reader, a smart card reader, a document reader, an image scanner, a bar code scanner, an RFID scanner, and/or any combination thereof, as well as other mechanisms for reading data stored on a government-issued ID.

Figure 3:
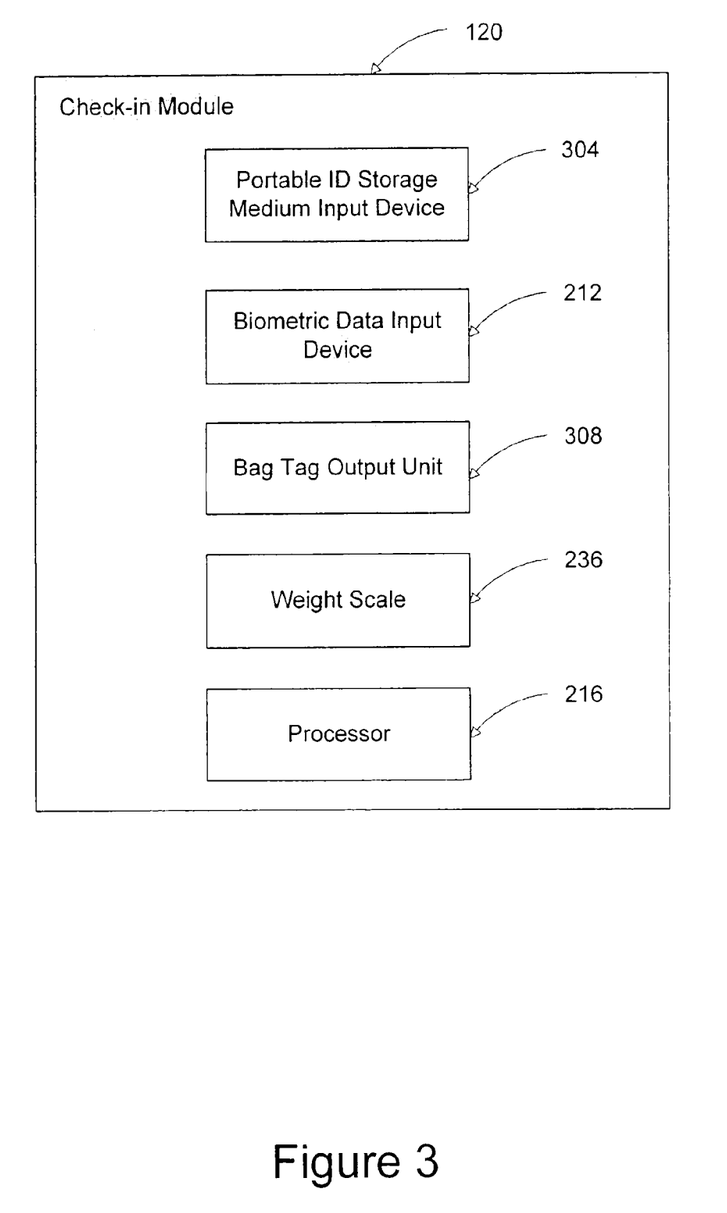
FIG. 3 illustrates a block diagram of the check-in module 120 of FIG. 1, in accordance with one embodiment of the present invention.

An embodiment of the check-in module 120 is illustrated in FIG. 3. The embodiment in FIG. 3 includes a biometric data input device 212, as described above. The check-in module 120 includes a portable ID storage medium input device 304, which includes one or more of an RFID scanner, a bar code scanner, a card reader, a smart card reader, and/or other mechanisms for reading the user's encoded biometric data stored on the portable ID storage medium 108. A processor 216 is configured to compare the captured biometric data with the biometric data read from the portable ID storage medium 108. When there is a match, the processor 216 outputs a signal authorizing check-in of the item by the user.

In FIG. 3, the check-in module 120 also includes a weight scale 236 capable of weighing the item. The check-in module 120 also includes a bag tag output unit 308. The tag output unit 308 may include an RFID writer, a printer, a card writer, a smart card writer, and/or other mechanisms for outputting or updating an identifying tag that is attached to the item for check-in. The tag may include various user information, such as a serial number issued to the user. The check-in module 120 also includes a printer capable of printing a receipt for a checked item. In one embodiment, the printer component of the bag tag output unit 308 has the additional capability of printing boarding passes. In another embodiment, a single printer of check-in module 120 is configured to print bag tags, boarding passes, and receipts. In some embodiments, the check-module 120 and the enrollment module 104 are situated on the same physical device or combination of devices. In one implementation, existing kiosks are retrofitted to include the components of the check-in module 120. Also, in some implementations, the check-in module 120 is overseen by an attendant 112.

Figure 4:
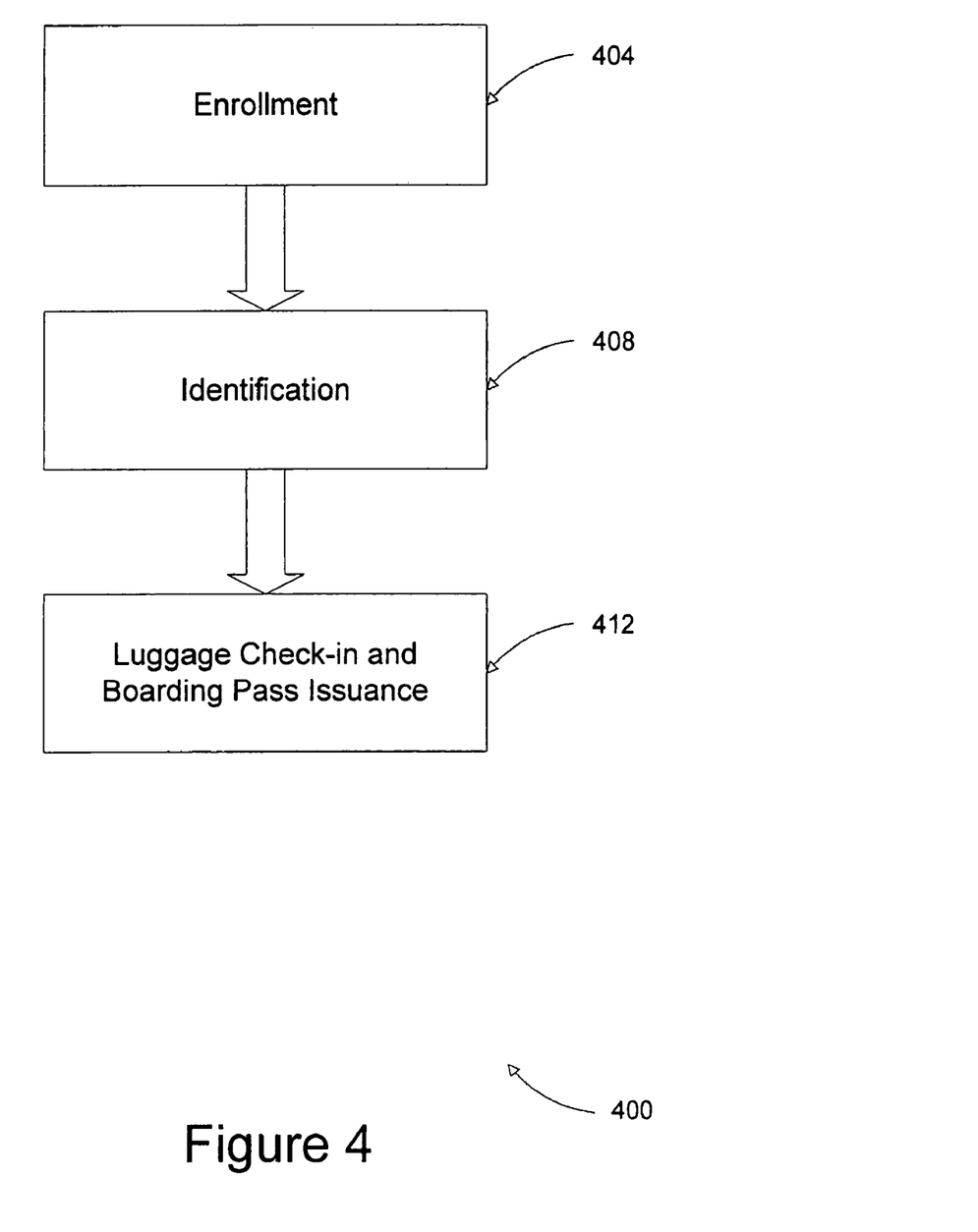
FIG. 4 illustrates a flow diagram of a method 400 of self checking items, performed in accordance with one embodiment of the present invention.

FIG. 4 illustrates a flow diagram of an overview of a method 400 for participating in a self check-in program, in accordance with one embodiment of the present invention. The method begins with an enrollment step 404, in which a user enrolls in the self-check program, for instance, by way of an enrollment module 104. After enrollment, the user may be identified in an identification step 408, in which a user's biometric data is compared with the encoded biometric data stored on the user's portable ID storage medium 108. If the data match, the user is permitted to check in an item, in step 412. In some embodiments, the user is also issued a boarding pass upon verification of the user's ID in step 408.

Figure 5A:
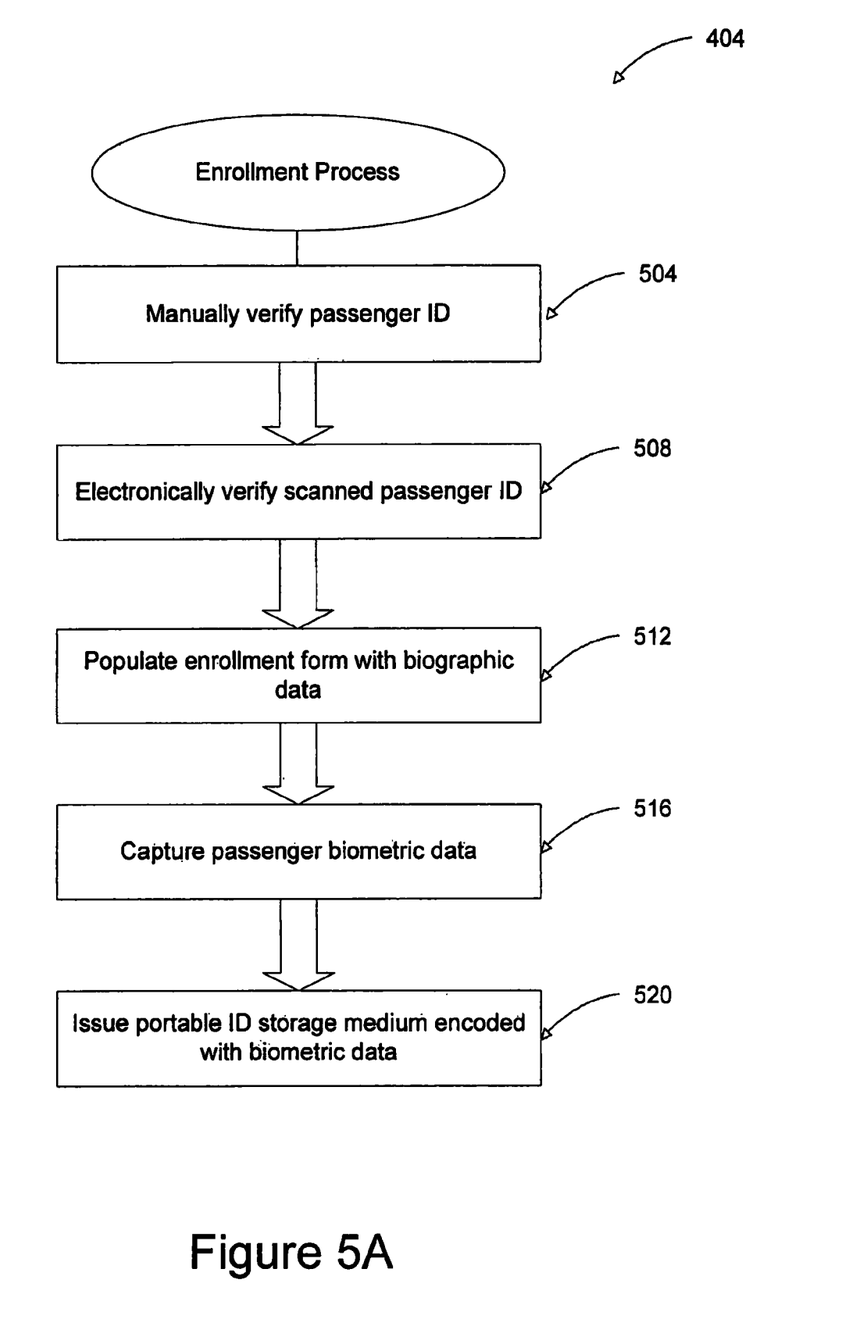
FIG. 5A illustrates a flow diagram of a method 404 of enrolling users in a self-check program, performed in accordance with one embodiment of the present invention.

An enrollment process 404, performed in accordance with one embodiment of the present invention, is illustrated in FIG. 5A. In one embodiment, an attendant 112 first verifies a user's identity by visually identifying the user and comparing the user to a government-issued ID. Manual verification 504 may include, for example, comparing a user's appearance to a photograph on the government-issued ID, and/or comparing a user's biographic data to biographic data on the government-issued ID, to determine a match.

Figure 5B:
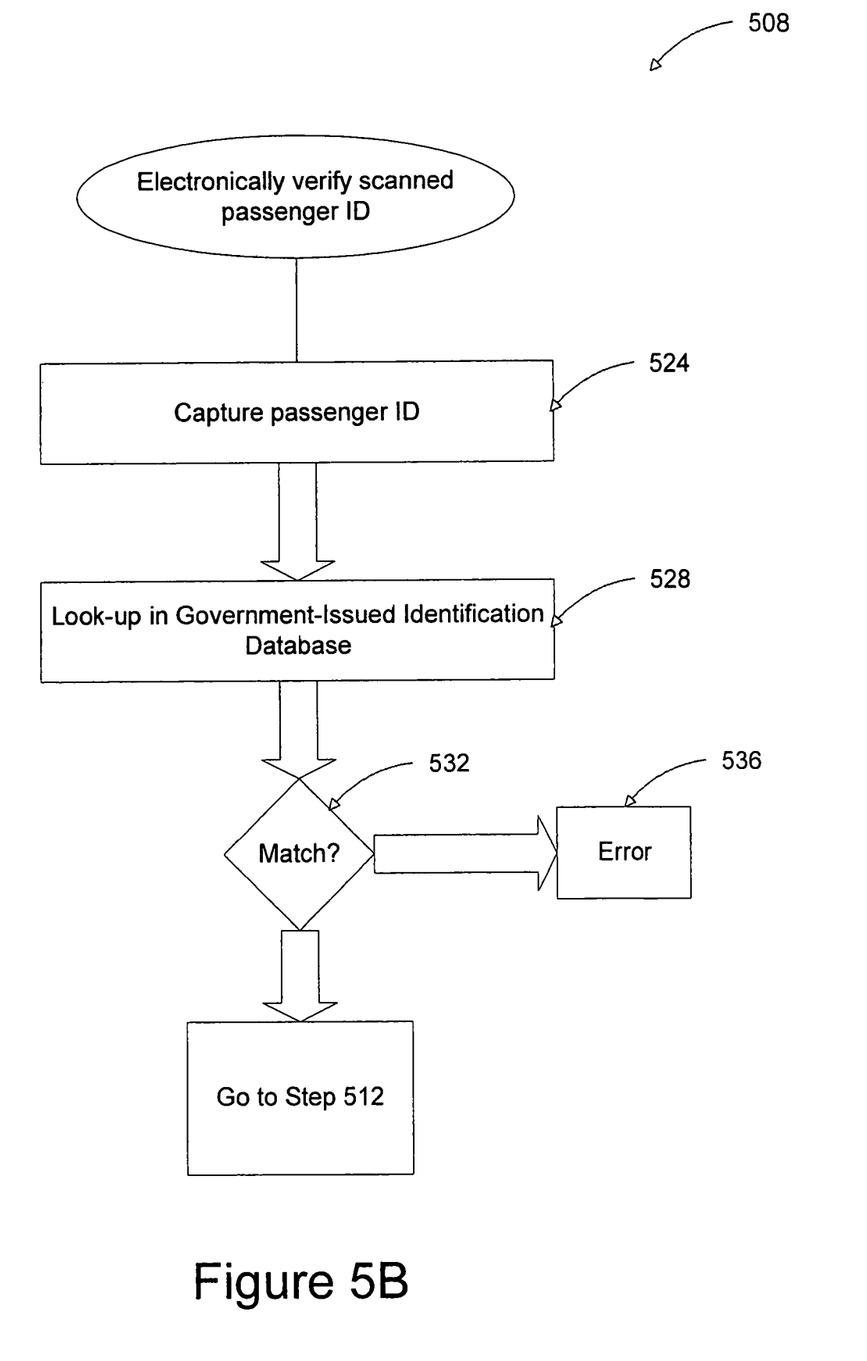
FIG. 5B illustrates a flow diagram of a method 508 of electronically verifying scanned user IDs, performed in accordance with one embodiment of the present invention.

In FIG. 5A, the enrollment process 404 proceeds from step 504 to step 508, in which the government-issued ID is electronically verified. FIG. 5B shows a flow diagram of an electronic verification process 508, performed in accordance with one embodiment of the present invention. In one embodiment, electronic verification process 508 includes the step of electronically reading the government-issued ID in step 524, and looking up the ID in a database 208 of government-issued IDs, in step 528. When there is no match, in step 532, an error is returned in step 536. In step 532, when the government-issued ID is found in the database 208, then the enrollment process 508 of FIG. 5A proceeds with population of an enrollment form with the user's biographic data, in step 512. The data used to populate the enrollment form can be retrieved from the identification database 208 or on the government-issued ID. Missing data might be entered by the user or attendant 112.

In FIG. 5A, the enrollment process 404 proceeds from step 512 to step 516, in which the user's biometric data is captured 516 with the biometric data input device 212. Biometric data may include fingerprint data, palm data, photographic data, vein data, voice data, retinal data, iris data, and/or other data indicating physical characteristics of the user. Redundant biometric data or biometric data of more than one type may be captured.

In FIG. 5A, in step 520, the portable ID storage medium output device 224 may issue a portable ID storage medium 108 having the encoded biometric data. Issuing the portable ID storage medium 108 in step 520 often includes encoding the biometric data, storing the encoded biometric data on the portable ID storage medium 108, and outputting the portable ID storage medium 108. Storing the biometric data can include, for example, printing a bar code, writing to an RFID, writing to a magnetic card, writing to a smart card, and or any other techniques for recording the encoded biometric data on a portable medium 108.

Figure 6:
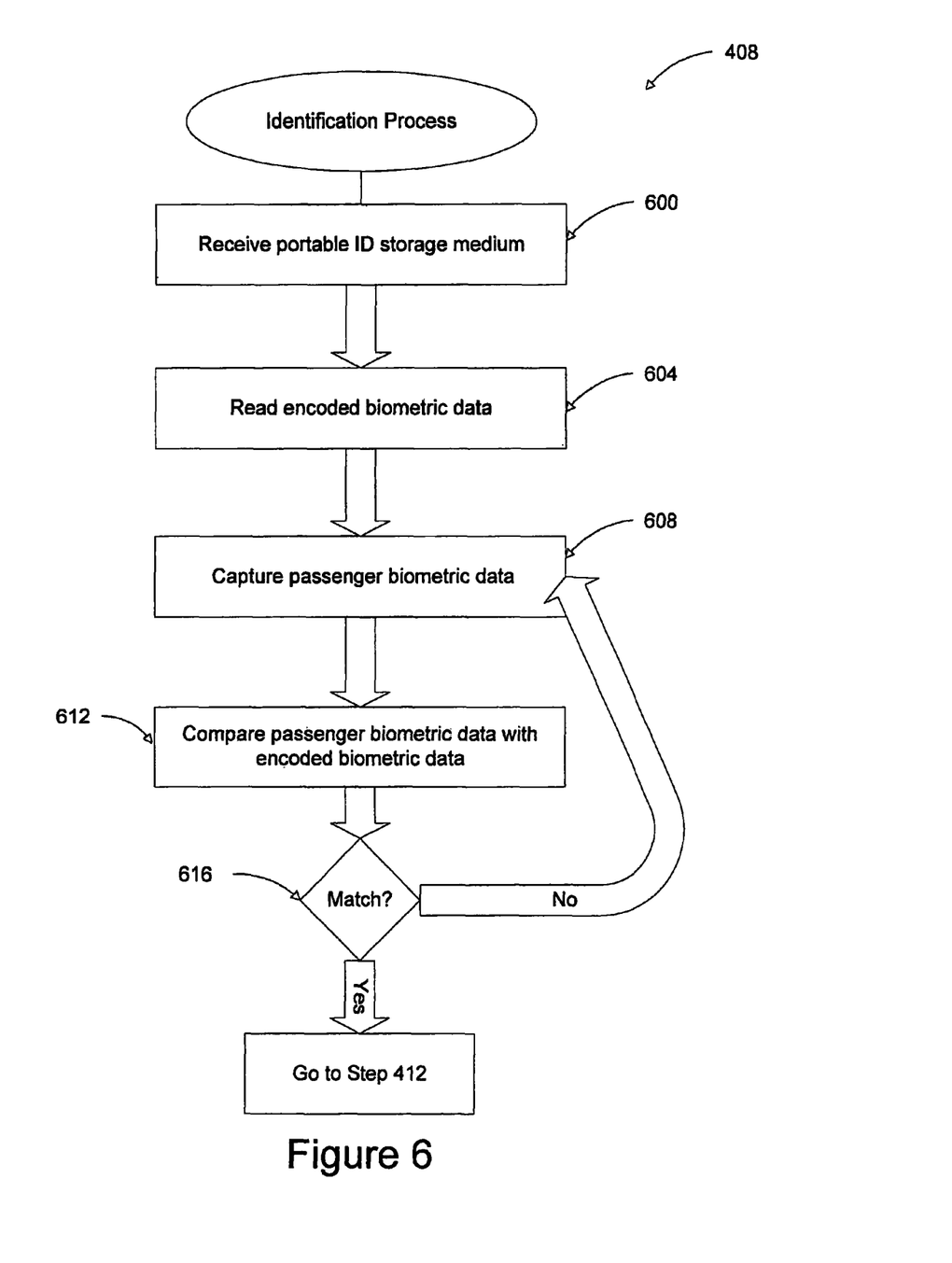
FIG. 6 illustrates a flow diagram of a method 408 of identifying users, performed in accordance with one embodiment of the present invention.

One embodiment of an identification process 408 performed in accordance with embodiments of the present invention is illustrated in FIG. 6. The process 408 includes the steps of receiving the portable ID storage medium 108, in step 600, and reading the encoded biometric data, in step 604. Receiving 600 and reading 604 can include, for example, scanning a bar code, scanning a card, scanning a smart card, scanning an RFID, and/or other techniques for reading the data stored on the portable ID storage medium 108.

In FIG. 6, in step 608, the passenger biometric data is captured. Capturing the biometric data can include, for example, scanning a fingerprint, scanning a palm, taking a photograph, scanning vein data, recording voice data, scanning retinal data, scanning iris data, and/or other techniques for capturing biometric data. The captured biometric data is then compared, in step 612, with the encoded biometric data stored on the portable ID storage medium 108. If there is no match, in step 616, biometric data can be re-captured in step 608. When there is a match, in step 616, the user is authorized to check-in an item or items according to the check-in process 412, described herein. In alternative embodiments, a match in step 616 authorizes a user to board a vehicle or other mode of transportation, or pass a security checkpoint.

Figure 7:
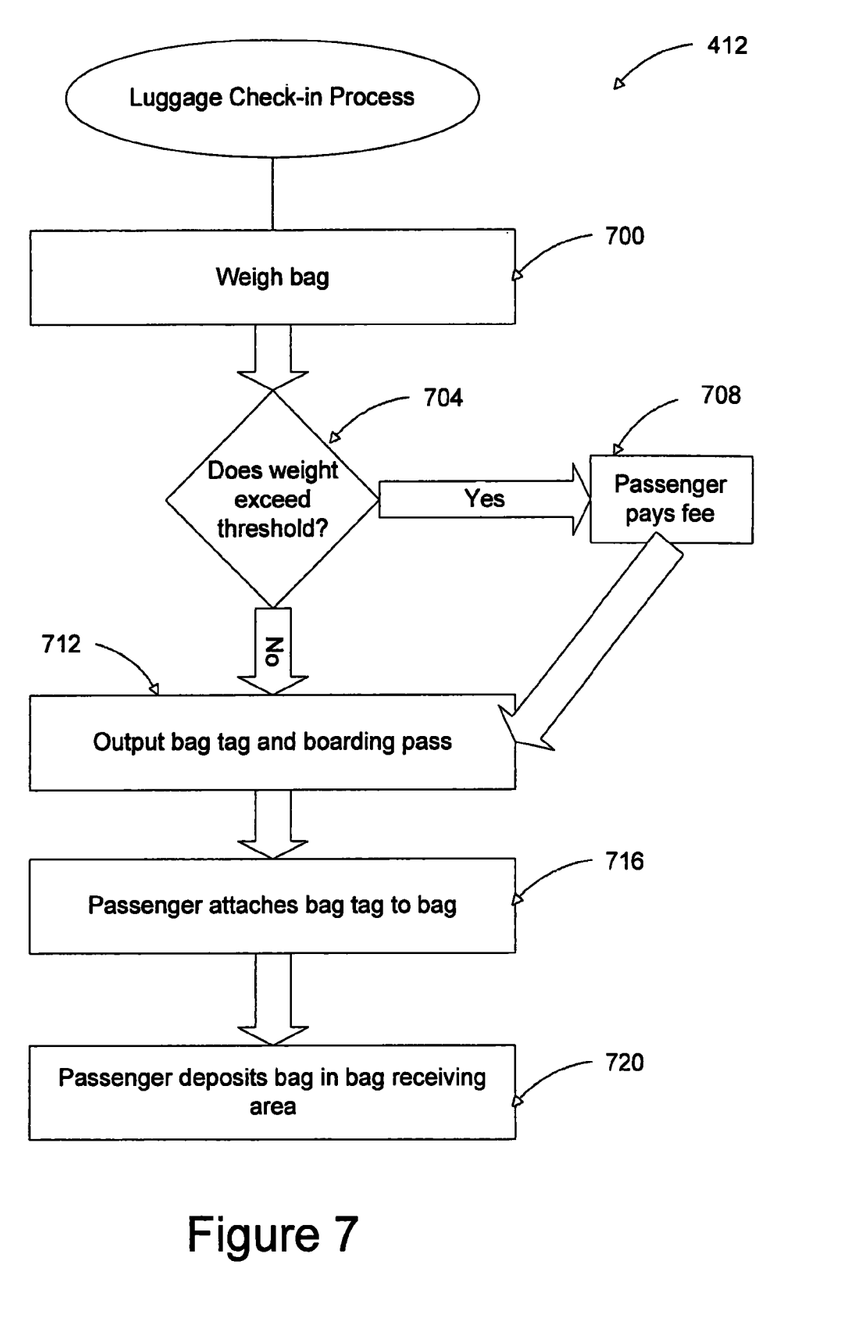
FIG. 7 illustrates a flow diagram of a method 412 of self check-in of items, performed in accordance with one embodiment of the present invention.

FIG. 7 illustrates one embodiment of the check-in process 412, performed in accordance with one embodiment of the present invention. The process 412 begins in step 700, in which the user's item is weighed, and the weight is compared against a threshold value. In step 704, if the weight exceeds the threshold value, in some implementations, the user is required to pay a fee in step 708 for the transportation of the heavier item. In step 704, if the weight does not exceed the threshold value, or when the fee has been paid in step 708, the tag output unit 308 of the check-in module 120 outputs a tag for attaching to the item, in step 712. In addition, in some embodiments, the printer of tag output unit 308 is further configured to output a boarding pass for the user. In one implementation, weight values are provided to a facility or service to facilitate storage, transport, or routing of the item. Also, in one implementation, an attendant 112 may oversee the check-in process.

In FIG. 7, outputting the tag in step 712 can include printing a tag or sticker, issuing an RFID tag, updating an existing RFID tag, updating an existing display unit, printing or updating a card or smart card, and/or other techniques for outputting an identifier for the item. The user is issued a receipt or identification slip for the checked item or items and may be invited to put the tag on the item as appropriate. The user may then attach the tag to the item, in step 716, and deposit the item in a receiving area, in step 720, such as a luggage belt, or give the item to a luggage handler.

In one embodiment, a turnstile and a conveyor belt control access to the movement of the checked-in bags. The user could present his or her items and the portable ID storage medium 108 to a control point close to the turnstile/belt combination. When the encoded biometric data matches captured data, in step 616 of FIG. 6, the turnstile opens, and the belt moves the items in a designated number until the count closes the loop. After depositing the bag or bags, the identification session could then expire.

A tag may be output in accordance with embodiments of the present invention and attached to an item for self check-in. One embodiment, the tag includes a permanent RFID tag that is programmed and personalized at the time of issuance, and updated for each trip to display all of the routing or travel information. Alternate embodiments are similar to those currently printed using bar-coding and serialization. Other embodiments of the tag include a sticky tag applied directly to the item or to a permanent bag tag, loops to attach to the item's handles, or any other tag capable of being attached to the item.

In one embodiment, the tag contains encoded personal biographic or biometric data, for instance, in alpha-numeric form, to identify the user. In alternate embodiments, the tag contains a serial number that is also in the user's possession. In still other embodiments, the tag contains a key to a database describing where the user's biometric data is encoded. Some embodiments of the invention would not require modification of existing item tagging or identification systems, but rather would provide a secure method of identifying a user before affixing a tag, and/or operate in conjunction with preexisting tagging or identification systems. Other embodiments include recording identifying data, serial numbers, or database keys on a boarding pass as well.

In some embodiments, biographic or biometric data could be provided to a government or other party for security purposes, or to airlines, for example, for passenger tracking or identification purposes. Embodiments of the system described herein can be used for checking an item for purposes other than transportation, such as for safe keeping. It will also be appreciated that the portable ID storage medium 108 can be used for functions other than identifying a user for self-checking an item. For example, a check-in module 120 may retrieve reservation or other information. Also, the identification process 408 can occur at various locations such as a security checkpoint, boarding location, or item retrieval area.

In a self-service environment implementing embodiments of the present invention, there is trust to ensure that users do not swap bags or make unsubstantiated claims. Trust can be established in a number of ways. Some embodiments use biometrics by storing or printing an identifier on the item tag that is based on data from the biometric enrollment process in a unique manner, hence providing a biological key. Once that number is created, it is uniquely associated with a person through his/her biometric information. For multi-person parties, such as families, a designated number of bags per user can be allowed, even if only one user is checking in.

Another embodiment incorporates a combination of biometrics and RFID. In such an embodiment, biometric data is used to enroll and verify the user, and the RFID tag can be used to associate the bag with the identity of the user.

Those skilled in the art should understand that alternatives to biometrics can be used for associating items with their owners or carriers. For instance, a smart card can be used to digitally sign or create special content that is written to an RFID tag or bar code. Using a public key infrastructure, for example, the user could then verify ownership of the item by presenting the card again.

According to some embodiments of the invention, encoded biometric data is stored only on the portable ID storage medium 108 and not in a database. According to other embodiments, encoded representations of the biometric data are stored in a database, and a database key is stored on the portable ID storage medium 108. Still in other embodiments, encoded biometric data is stored in a database, and no portable ID storage medium 108 is issued. In another embodiment, encoded biometric or personal data is printed directly on a boarding pass rather than on a separate medium.

Some implementations of the present invention provide customer service benefits. For example, a self-tagging and check-in system may ease the difficulty inherent in checking bags. Check-in wait times are reduced, and passengers no longer need to transport bags to different areas of a terminal. Bag checking is more predictable due to more accurate and efficient routing, handling, check-in, and pick-up of bags.

Airline operations may also benefit from implementations of the present invention. For example, fewer staff may be required because passengers can check bags unassisted. Bags can be screened sooner, which decreases TSA-related lost bags. The efficiency of bag routing decreases airline injury claims from baggage handling. The movement of passengers through the terminal may be more efficient because passengers spend less time waiting in a ticket counter line with their bags and less time boarding and de-planing. Such increased efficiency yields shorter aircraft turn times.

Implementations of the present invention may also yield security benefits. Using the techniques described above, it is possible to verify that a particular bag belongs to a particular passenger. Passenger identification documents can be authenticated more reliably than the often cursory visual inspection of conventional check-in procedures. Bag routing also may be more secure due to having fewer touch points for checked bags and a reduced number of unscreened bags and passengers in the check-in lobby. Finally, passenger data can be collected in the manner preferred by the carriers and in compliance with government programs.

Embodiments of the invention, including the methods, apparatus, modules, units, engines, and devices described herein, can be implemented in digital electronic circuitry, or in computer hardware, firmware, software, or in combinations of them. Embodiments of the invention can be implemented in a computer program product tangibly embodied in a machine-readable storage device for execution by a programmable processor. Method steps of the invention can be performed by a programmable processor executing a program of instructions to perform functions of the invention by operating on input data and generating output.

Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It will be understood that the functions and processes described herein may be implemented in a variety of other ways. It will also be understood that each of the various functional units and modules described may correspond to one or more computing platforms in a network. That is, the methods, functions, services and processes described herein may reside on individual machines or be distributed across or among multiple machines in a network or even across networks. It should therefore be understood that the present invention may be implemented using any of a wide variety of hardware, network configurations, operating systems, computing platforms, programming languages, service oriented architectures (SOAs), communication protocols, etc., without departing from the scope of the invention.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for enrolling in a self check-in program for a user to check-in one or more items for transportation, the method comprising:
   electronically reading personal identification (ID) information from a government-issued ID document with an ID input device;
   electronically verifying the ID document based on the personal ID information, including querying a database of government-issued ID documents to identify the ID document;
   receiving additional personal ID information input at an input device for enrollment in the self check-in program, the additional personal ID information being personal ID information not stored on the government-issued ID document or in the database of government-issued ID documents;

capturing, when the ID document is identified in the database, biometric data from the user;

storing the biometric data in a database, the biometric data being encoded;

creating a biological key based on the biometric data, wherein the biological key is a number and wherein the biological key is used to identify the user;

storing a database key on a portable ID storage medium, the database key configured to allow access to the biometric data stored in the database; and issuing the portable ID storage medium having the database key to the user, thereby completing the method for enrolling in the self check-in program, the portable ID storage medium configured to initiate an identification session for self check-in by the user, using the biometric data stored in the database, of an item for transportation, wherein the self check-in program generates an item tag for the item, the biological key being stored on the item tag to identify the user, and wherein the item tag is attachable to the item to identify the item as belonging to the user, the identification session expiring upon deposit of the item on a conveyor in response to the presentation of the portable ID storage medium by the user at a control point associated with access to the conveyor and after the user has been identified based on the biometric data stored in the database, and the conveyor moving the item away from the user and controlling access to checked-in items, thereby allowing the user to self check-in the item unassisted by an attendant.

2. The method of claim 1, further comprising:
verifying the ID document based on the user.

3. The method of claim 2, the personal ID information including photographic data, verifying the ID document based on the user including:
comparing the photographic data with the appearance of the user to determine a match.

4. The method of claim 2, the personal ID information including biographic data, verifying the ID document based on the user including:
comparing the biographic data with the user to determine a match.

5. The method of claim 1, wherein the biometric data includes one or more selected from the group consisting of: fingerprint data, photographic data, vein data, voice data, retinal data, and iris data.

6. A data processing apparatus for enrolling in a self check-in program for a user to check-in one or more items for transportation, the apparatus comprising:

an identification (ID) input device configured to electronically read personal ID information from a government-issued ID document;

an ID verification device configured to electronically verify the ID document based on the personal ID information, including querying a database of government-issued ID documents to identify the ID document;

an input device configured to receive additional personal ID information for enrollment in the self check-in program, the additional personal ID information being personal ID information not stored on the government-issued ID document or in the database of government-issued ID documents;

a biometric data input device configured to capture, when the ID document is identified in the database, biometric data from the user;

a processor configured to create a biological key based on the biometric data, wherein the biological key is a number and wherein the biological key is used to identify the user;

a database configured to store the biometric data of the user, the biometric data being encoded; and a portable ID storage medium output device configured to:
store a database key on a portable ID storage medium, the database key configured to allow access to the database, and issue the portable ID storage medium having the database key to the user, thereby completing enrollment in the self check-in program, the portable ID storage medium configured to initiate an identification session for self check-in by the user, using the biometric data stored in the database, of an item for transportation, wherein the self check-in program generates an item tag for the item, the biological key being stored on the item tag to identify the user, and wherein the item tag is attachable to the item to identify the item as belonging to the user, the identification session expiring upon deposit of the item on a conveyor in response to the presentation of the portable ID storage medium by the user at a control point associated with access to the conveyor and after the user has been identified based on the biometric data stored in the database, and the conveyor moving the item away from the user and controlling access to checked-in items, thereby allowing the user to self check-in the item unassisted by an attendant.

7. The data processing apparatus of claim 6, the ID input device including one selected from the group consisting of: a card reader, a smart card reader, a document reader, an image scanner, a bar code scanner, and an RFID scanner.

8. The data processing apparatus of claim 6, the biometric data input device including one selected from the group consisting of: a fingerprint scanner, a camera, a vein scanner, a microphone, an iris scanner, and a retinal scanner.

9. The data processing apparatus of claim 6, the portable storage medium output device including at least one selected from the group consisting of: a printer, an RFID writer, a card writer, and a smart card writer.

10. The data processing apparatus of claim 6, further comprising:
a touch screen display capable of receiving the personal ID information.

11. The method of claim 1, wherein the database key is stored on an RFID tag, and wherein the portable ID storage medium includes the RFID tag.

12. The apparatus of claim 6, wherein the database key is stored on an RFID tag, and wherein the portable ID storage medium includes the RFID tag.

* * * * *